(No Model.) 2 Sheets—Sheet 1.
D. M. JENNINGS.
SULKY HAY RAKE.
No. 550,889. Patented Dec. 3, 1895.
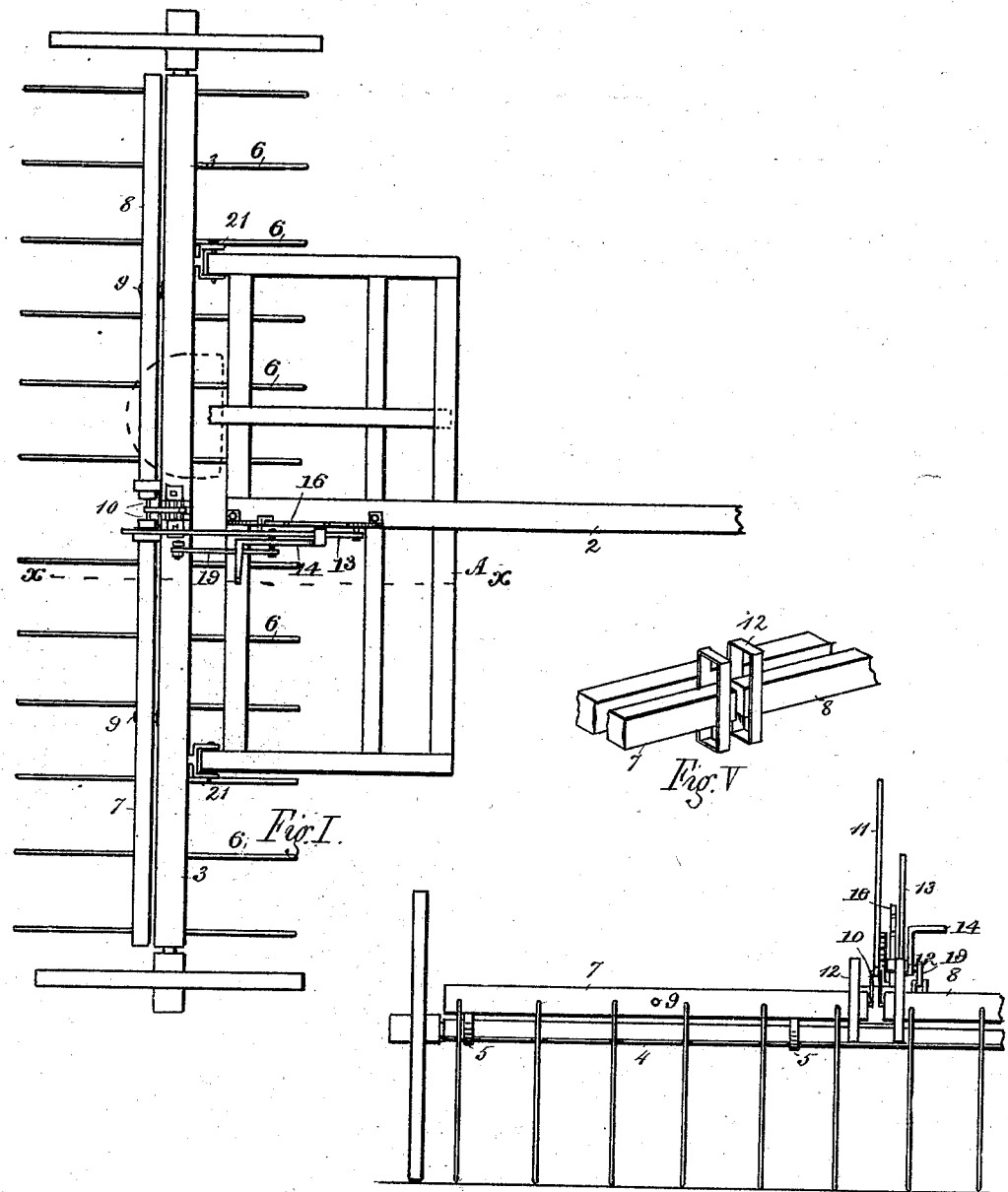
Witnesses
R. S. Millar
L. M. Adams
Inventor
D. M. Jennings
By J. Bailey Atty (No Model.) 2 Sheets—Sheet 2.
D. M. JENNINGS.
SULKY HAY RAKE.
No. 550,889. Patented Dec. 3, 1895.
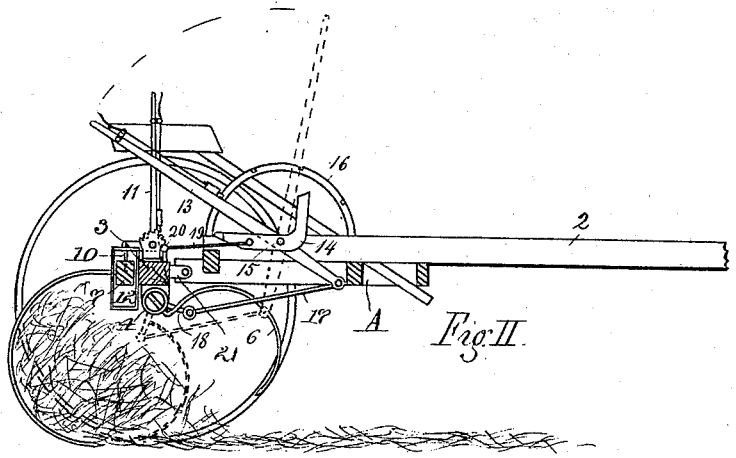
Fig. II.
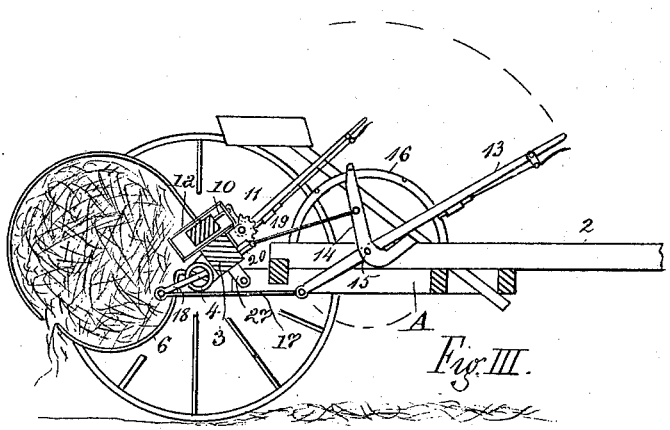
Fig. III.
Witnesses,
R. S. Millar
L. M. Adams
Inventor,
D. M. Jennings
By J. Bailey Atty

UNITED STATES PATENT OFFICE.

DAVID M. JENNINGS, OF GANT, MISSOURI.

SULKY HAY-RAKE.

SPECIFICATION forming part of Letters Patent No. 550,889, dated December 3, 1895.

Application filed March 14, 1895. Serial No. 541,692. (No model.)

*To all whom it may concern:*

Be it known that I, DAVID M. JENNINGS, a citizen of the United States, residing at Gant, in the county of Audrain and State of Missouri, have invented a new and useful Improvement in Sulky Hay-Rakes, which improvement is fully set forth in the following specification and accompanying drawings, in which—

Figure I is a plan view of my improved sulky hay rake and carrier; Fig. II, a vertical longitudinal section through line *x x* of Fig. I; Fig. III, a similar view showing the action of the hoisting mechanism; Fig. IV, a rear view of the machine, and Fig. V a detail view of the keeper which guards the junction of the sections of the rake-beam.

My invention relates to sundry improvements in hay-rakes; and its object is to provide a simple, novel, and efficient device consisting of a set of curved raking-teeth and a supplemental set of carrying-teeth, which may be brought into action at desired intervals without stopping the progress of the machine, and which, in conjunction with the raking-teeth, may be utilized for embracing and lifting the mass of hay collected by the latter and conveying the same to any desired locality to be stored or stacked. When the hay is discharged, the raking-teeth remain elevated until required to resume their operation.

Other peculiar advantages of the device will be hereinafter described.

Referring to the accompanying drawings, A represents the main frame, to which the draft-pole 2 is attached. A perch-beam 3 is located directly above the tubular axle 4, which is journaled in collars or bearings 5, depending from the perch-beam. The carrying-teeth 6 are inserted in the axle. The raking-teeth are attached to a bar composed of two sections 7 and 8, both being pivotally attached at their longitudinal centers to the perch-beam by bolts 9. The adjacent inner ends of the sections are joined by a loosely-jointed branched connection 10 to an angle-lever 11, permitting the rake-heads 7 and 8 to have a limited play independent of said lever. The junction is confined in a keeper 12, (see Fig. V,) which allows a certain degree of vertical movement. It will be seen that the sections are thus made capable of adjusting themselves to the surface of the ground when passing along ridges or depressions. A lock-lever 13 and a trip-lever 14 are pivotally attached to the side of the draft-pole by a bolt 15. The lock-lever moves on a segment 16, and its shorter arm is connected by a rod 17 to a rigid arm 18, projecting from the axle. The trip-lever is connected by a bar 19 to an arm 20, projecting from the perch-beam, which is attached to the main frame by yokes 21.

The operation of the device will now be described. The normal working position of the rake and the position of the levers are shown in Fig. II. When a sufficient quantity of hay is collected by the rake, the driver of the machine throws the locking-lever forward to an approximately vertical position, as indicated by the dotted lines, and the mass of hay is inclosed. The lock-lever now engages the lateral extremity of the trip-lever and carries the latter with it. The trip-lever by its connection with the perch-beam causes the latter to roll or pitch forward, while the under connection of the lock-lever to the axle causes the latter to swing backwardly and lift the hay to the position shown in Fig. III. When the load is to be dumped, the locking-lever is drawn partly back and the driver pushes the trip-lever backwardly by placing his foot on the laterally-projecting head. The axle and its connections then resume their initial positions. It will be observed that by the proper adjustment of the levers the rake is capable of depositing the hay in windrows.

What I claim as new is—

In a sulky hay rake and carrier, the combination of the axle provided with the carrying teeth, the perch-beam having bearings within which is journaled said axle, the locking lever having its lower end connected to the axle, and the trip lever with a lateral projection at one end standing in the plane of the movement of the locking lever and connected near its opposite end to said perch-beam said latter end being under the control of the driver's foot, and the vertically adjustable bars pivotally connected to the rear side of said perch-beam and provided with the raking teeth, substantially as set forth.

In testimony that I claim the foregoing I have hereunto set my hand, this 25th day of February, 1895, in the presence of witnesses.

DAVID M. JENNINGS.

Witnesses:
E. F. BEATTY,
J. W. BROWN.